United States Patent
Chen et al.

(10) Patent No.: US 11,742,544 B2
(45) Date of Patent: Aug. 29, 2023

(54) BATTERY MODULE

(71) Applicant: CONTEMPORARY AMPEREX TECHNOLOGY CO., LIMITED, Ningde (CN)

(72) Inventors: Sien Chen, Ningde (CN); Shoujiang Xu, Ningde (CN); Chunyan Feng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 1045 days.

(21) Appl. No.: 16/544,689

(22) Filed: Aug. 19, 2019

(65) Prior Publication Data

US 2020/0274115 A1 Aug. 27, 2020

(30) Foreign Application Priority Data

Feb. 26, 2019 (CN) .......................... 201910141026.0

(51) Int. Cl.
*H01M 50/20* (2021.01)
*H01M 50/26* (2021.01)
*H01M 50/209* (2021.01)
*H01M 50/262* (2021.01)

(52) U.S. Cl.
CPC ....... *H01M 50/209* (2021.01); *H01M 50/262* (2021.01)

(58) Field of Classification Search
CPC .......................... H01M 50/262; H01M 50/209
See application file for complete search history.

(56) References Cited

U.S. PATENT DOCUMENTS

| 2018/0212212 A1* | 7/2018 | Cao ..................... H01M 50/224 |
| 2019/0013501 A1 | 10/2019 | Sakura | |

FOREIGN PATENT DOCUMENTS

| CN | 205609590 U | 9/2016 |
| CN | 206022482 U | 3/2017 |
| CN | 207441760 U | 6/2018 |
| CN | 108428834 A | 8/2018 |
| CN | 108899456 A | 11/2018 |
| JP | 2000138044 A | 5/2000 |

OTHER PUBLICATIONS

Office Action dated Mar. 5, 2020 for CN Application No. 201910141026.0.
Office Action dated Feb. 20, 2019 for EP Application No. 19191678.2.

\* cited by examiner

*Primary Examiner* — Ula C Ruddock
*Assistant Examiner* — Frank A Chernow
(74) *Attorney, Agent, or Firm* — Suiter Swantz pc llo

(57) ABSTRACT

The present disclosure provides a battery module, comprising: a plurality of batteries stacked in a length direction L of the battery module; and an end plate located at an end of the plurality of batteries in the length direction L. The end plate is provided with at least one end plate mounting hole, and each of the at least one end plate mounting holes extends along a height direction H of the battery module. The end plate includes an inner wall and an external wall that are disposed opposite to each other in the length direction L, and an axis of each of the at least one end plate mounting holes includes a first distance L1 from the inner wall and a second distance L2 from the external wall. The first distance L1 is greater than the second distance L2.

10 Claims, 2 Drawing Sheets

BATTERY MODULE

CROSS-REFERENCE TO RELATED APPLICATIONS

The present application claims priority to Chinese Patent Application No. 201910141026.0, filed on Feb. 26, 2019, the content of which is incorporated herein by reference in its entirety.

TECHNICAL FIELD

The present disclosure relates to the field of energy storage devices, and in particular, to a battery module.

BACKGROUND

A battery module includes a plurality of batteries, end plates disposed at two ends of the plurality of batteries, and side plates respectively disposed at two sides of the plurality of batteries. The end plates are fixedly connected to the side plates so as to clamp the battery. The end plate is provided with an end plate mounting hole, in which respective battery modules are to be mounted when being assembled to form a battery pack. Meanwhile, during operation of the battery module, the end plate is subjected to an expansion force from the battery, and an inner end surface of the end plate is subjected to the maximum expansion force of the battery. Therefore, the inner end surface of the end plate has a risk of breaking at a position of the end plate mounting hole, thereby resulting in the low strength of the end plate.

SUMMARY

In view of this, the present disclosure provides a battery pack for solving the problem existing in the related art that the end plate has low strength under an expansion force of the battery.

An embodiment of the present disclosure provides a battery module, including: a plurality of batteries stacked in a length direction L of the battery module; and an end plate located at an end of the plurality of batteries in the length direction L. The end plate is provided with at least one end plate mounting hole, and each of the at least one end plate mounting holes extends along a height direction H of the battery module. The end plate includes an inner wall and an external wall that are disposed opposite to each other in the length direction L, and an axis of each of the at least one end plate mounting holes includes a first distance L1 from the inner wall and a second distance L2 from the external wall. The first distance L1 is greater than the second distance L2.

Preferably, the end plate further includes a first mounting portion and a second mounting portion that are spaced apart along a width direction W of the battery module. The first mounting portion is fixed to the inner wall and the external wall, and the second mounting portion is fixed to the inner wall and the external wall. Each of the first plate portion and the second portion is provided with one of the at least one end plate mounting holes.

Preferably, the external wall comprises a straight wall, a first oblique wall and a second oblique wall, and the first oblique wall and the second oblique wall are located at two ends of the straight wall along the width direction W. The straight wall is in parallel with the inner wall, and both the first oblique wall and the second oblique wall are oblique towards the inner wall. An obtuse angle formed between the first oblique wall and the straight wall is within a range of 145° to 175°, and an obtuse angle formed between the second oblique wall and the straight wall is within a range of 145° to 175°.

Preferably, the end plate further comprises a first side wall and a second side wall at two ends in the width direction W. Along the length direction L of the battery module, a length of the first side wall is smaller than a distance D2 between the straight wall and the inner wall, and a length of the second side wall is smaller than the distance D2 between the straight wall and the inner wall.

Preferably, the first mounting portion is fixed to the straight wall and the inner wall, and the second mounting portion is fixed to the straight wall and the inner wall. A first cavity is defined by the first side wall, the first oblique wall, the inner wall, the first mounting portion, and a part of the straight wall. A second cavity is defined by the second side wall, the second oblique wall, the inner wall, the second mounting portion, and another part of the straight wall. The first cavity has a width A along the width direction W, and the second cavity has a width A along the width direction W. The width A is within a range of 25 mm to 45 mm.

Preferably, a first strengthening rib is provided in the first cavity, and a second strengthening rib is provided in the second cavity. The first strengthening rib and the second strengthening rib are obliquely disposed and towards different directions. The first strengthening rib includes two ends fixed to the inner wall and the straight wall, and the second strengthening rib includes two ends fixed to the inner wall and the straight wall. An obtuse angle formed between the first strengthening rib and the straight wall is a range of 100° to 150°, and an obtuse angle formed between the second strengthening rib and the straight wall is within a range of 100° to 150°.

Preferably, a third cavity is defined by the first mounting portion, the second mounting portion, the inner wall and the straight wall. A plurality of third strengthening ribs is provided in the third cavity, and each of the plurality of third strengthening ribs includes two ends fixed to the inner wall and the straight wall. Each of a thickness of the first strengthening rib, a thickness of the second strengthening rib and a thickness of the third strengthening rib is smaller than or equal to each of a thickness of the inner wall and a thickness of the external wall.

Preferably, each of the first mounting portion and the second mounting portion is in a prismatic structure, and the first mounting portion and the second mounting portion are symmetrically disposed with respect to the length direction L of the battery module. Each of the plurality of third strengthening ribs is disposed obliquely, and adjacent third strengthening ribs of the plurality of third strengthening ribs are oblique towards different directions. A structure including a triangular cross section is formed by two adjacent third strengthening ribs of the plurality of third strengthening ribs and the inner wall or the straight wall; or a structure having a trapezoidal cross section is formed by one of the plurality of third strengthening ribs, the inner wall, the straight wall and a corresponding mounting portion of the first mounting portion and the second mounting portion.

Preferably, a sum of a thickness of the inner wall and a thickness of the external wall is D1, a distance between the inner wall and the external wall is D2, and a ratio of D1 to D2 is within a range of 1/5 to 3/5.

Preferably, each of the at least one end plate mounting holes is a circular hole, a kidney-shaped hole or an elliptical hole.

In this embodiment, the first distance L1 is greater than the distance L2, that is, a distance between the first end plate mounting hole and the inner wall is greater than a distance between the first end plate mounting hole and the external wall. Therefore, if the end plate has a larger thickness at the position of the first end plate mounting hole, a risk of the inner wall breaking under the expansion force of the battery can be reduced, so that the strength of the end plate can be increased. Moreover, the structure of the end plate in this embodiment can also reduce a risk that the external wall deforms outward under the expansion force of the battery, thereby reducing pressing of the mounting bolt caused by the deformation of the inner wall and thus improving the assembly reliability and stability of the battery module.

BRIEF DESCRIPTION OF DRAWINGS

In order to more clearly illustrate the technical solutions of the embodiments of the present disclosure, the drawings used in the embodiments will be briefly described as below. The drawings described below are merely some embodiments of the present disclosure. Based on these drawings, those skilled in the art can obtain other drawings without paying creative efforts.

REFERENCE NUMBER

1—end plate;
11—inner wall;
12—external wall;
   121—straight wall;
   122—first oblique wall;
   123—second oblique wall;
13—first side wall;
14—second side wall;
15—first cavity;
   151—first strengthening rib;
16—second cavity;
   161—second strengthening rib;
17—third cavity;
   171—third strengthening rib;
18—first mounting portion;
   181—first end plate mounting hole;
19—second mounting portion;
   191—second end plate mounting hole;
2—side plate;
3—insulation component; and
4—battery.

DESCRIPTION OF EMBODIMENTS

For better understanding the technical solutions of the present disclosure, the embodiments of the present disclosure will be described in detail below with reference to the accompanying drawings.

It should be understood that, the described embodiments are merely parts of, rather than all of the embodiments of the present disclosure. Based on these embodiments described in the present disclosure, other embodiments obtained by those skilled in the art without paying creative efforts shall fall within the protection scope of the present disclosure.

The terms in the embodiments of the present disclosure are merely used for describing specific embodiments, but not intended to limit the present disclosure. The singular forms such as "a", "an", "said" and "the" are also intended to include the plural forms, unless the context indicates otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 1:
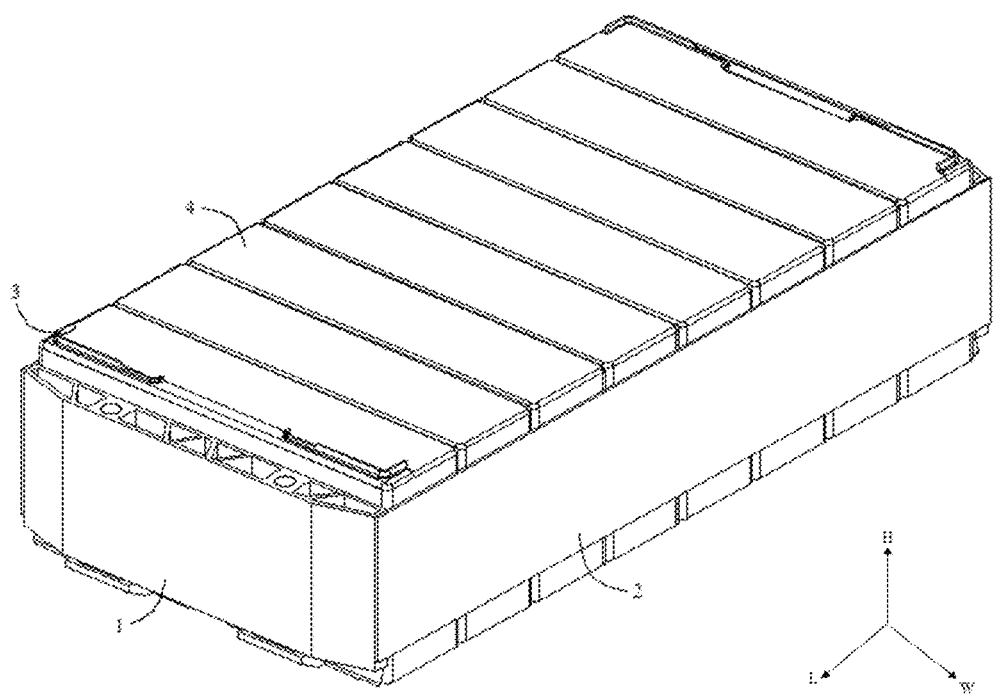
FIG. 1 is a schematic view of a structure of a battery module according to an embodiment of the present disclosure.
Figure 2:
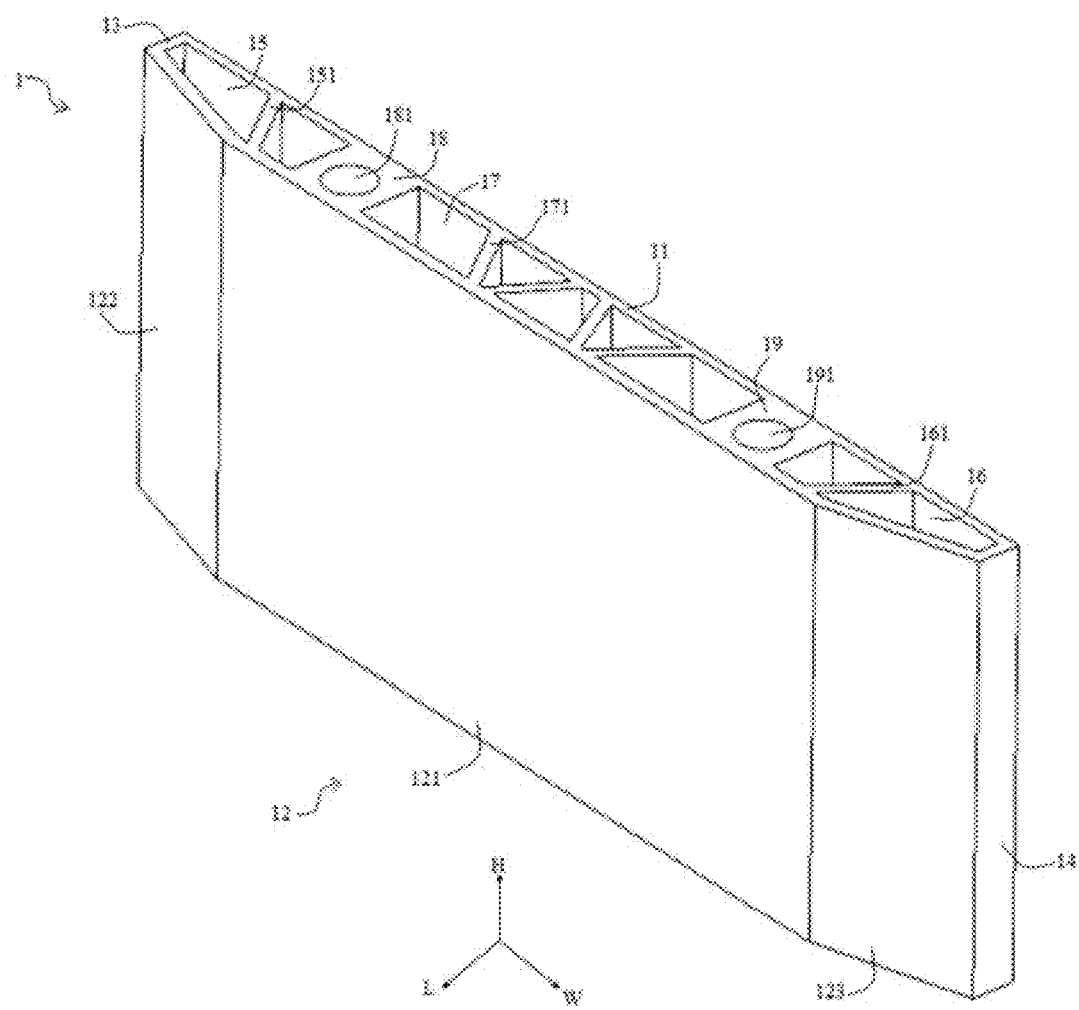
FIG. 2 is a schematic view of a structure of an end plate shown in FIG. 1.
Figure 3:
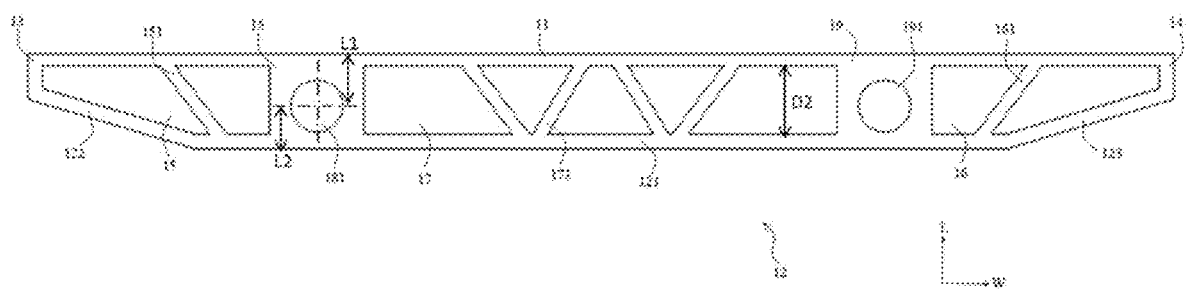
FIG. 3 is a top view of the structure of the end plate shown in FIG. 2.

Please refer to FIGS. 1-3, in which FIG. 1 is a schematic view of a structure of a battery module provided by an embodiment of the present disclosure; FIG. 2 is a schematic view of a structure of an end plate shown in FIG. 1; and FIG. 3 is a top view of the structure of the end plate shown in FIG. 2.

An embodiment of the present disclosure provides a battery module. As shown in FIG. 1, the battery module includes a plurality of batteries 4 stacked in a length direction L of the battery module, and end plates 1 disposed at ends of the plurality of batteries 4 in the length direction L. Two end plates 1 are provided and disposed opposite to each other in the length direction L. Moreover, the battery module further includes two side plates 2 disposed opposite to each other in a width direction W. An insulation component 3 is arranged between an end plate 1 and a battery 4 adjacent to the end plate 1. The insulation component 3 has good thermal insulation properties and insulation properties, and thus can serve as an insulation structure and a thermal insulation structure between the end plate 1 and the battery 4 adjacent to the end plate 1. After the end plate 1 and the side plate 2 are fixed together by laser welding, the insulation component 3 and the battery 4 can be clamped to form the battery module shown in FIG. 1.

Meanwhile, for assembling the battery module, the end plate 1 of the battery module is provided with an end plate mounting hole (e.g., including a first end plate mounting hole 181 and a second end plate mounting hole 191 shown in FIG. 2 and FIG. 3), and a mounting bolt (not shown) is inserted into the end plate mounting hole to achieve assembly of the battery module.

The end plate 1 has the low strength and rigidity at a position of the end plate mounting hole. After the assembly is completed, the end plate 1 is subjected to an outward expansion force from the battery 4, and an inner end surface of the end plate 1 is subjected to the maximum expansion force of the battery. Therefore, the inner end surface of the end plate 1 has a risk of breaking at the position of the end plate mounting hole, thereby resulting in the low strength of the end plate. Moreover, when the inner end surface of the end plate 1 deforms outward under the expansion force of the battery, the inner end surface will press the mounting bolt disposed in the end plate mounting hole, resulting in a decrease in the mounting stability and reliability of the battery module. For solving this technical problem, an embodiment of present disclosure improves a structure of the end plate 1 so as to increase the strength of the end plate 1.

As shown in FIG. 2 and FIG. 3, in this battery module, the end plate mounting hole extends along a height direction H of the battery module, and the end plate 1 includes an inner wall 11 and an external wall 12 that are oppositely disposed along the length direction L of the battery module. The mounting hole is arranged between the inner wall 11 and the external wall 12, and an axis of the end plate mounting hole has a first distance L1 from the inner wall 11, and a second distance L2 from the external wall 12. Here, the distance L1 is greater than the second distance L2.

In this embodiment, as shown in FIG. 3, the first distance L1 is greater than the distance L2, that is, a distance between the first end plate mounting hole 181 (or the second end plate mounting hole 191) and the inner wall 11 is greater than a distance between the first end plate mounting hole 181 (or the second end plate mounting hole 191) and the external wall. Therefore, if the end plate 11 has a greater thickness at the position of the first end plate mounting hole 181 (or the second end plate mounting hole 191), the risk of the inner wall 11 breaking under the expansion force of the battery can be reduced, so that the strength of the end plate 1 can be increased. Meanwhile, the structure of the end plate 1 in this embodiment can also reduce a risk that the inner wall 11 deforms outward under the expansion force of the battery, thereby reducing pressing of the mounting bolt caused by the deformation of the inner wall 11 and thus improving the assembly reliability and stability of the battery module.

Specifically, as shown in FIGS. 2 and 3, the end plate 1 further includes a first mounting portion 18 and a second mounting portion 19 that are spaced apart in the width direction W of the battery module. The first mounting portion 18 is fixed to the inner wall 11 and the external wall 12, and the second mounting portion 19 is fixed to the inner wall 11 and the external wall 12. That is, each of the first mounting portion 18 and the second mounting portion 19 is a solid structure connected between the inner wall 11 and the external wall 12. Therefore, the first end plate mounting hole 181 is arranged in the first mounting portion 18, and the second end plate mounting hole 191 is arranged in the second mounting portion 19.

In this embodiment, the end plate 1 is provided with two end plate mounting holes, thereby achieving assembly of the battery module. Moreover, arranging the two end plate mounting holes in the mounting portions having solid structures can improve the strength and rigidity of the inner wall 11 and the external wall 12.

In this embodiment shown in FIG. 2 and FIG. 3, each of the first mounting portion 18 and the second mounting portion 19 is formed in a square structure, each of the two mounting portions has a dimension in each direction that is greater than a dimension of the end plate mounting hole in this direction, so that the two mounting portions still have a sufficient thickness to withstand force in every direction even though the end plate mounting holes are arranged in the two mounting portions.

In addition, as shown in FIG. 2 and FIG. 3, the external wall 12 includes a straight wall 121, a first oblique wall 122, and a second oblique wall 123 along the width direction W of the battery module, and the first oblique wall 122 and the second oblique wall 123 are located at two ends of the straight wall 121 in the width direction W. Meanwhile, the straight wall 121 is parallel with the inner wall 11, and both the first oblique wall 122 and the second oblique wall 123 are oblique towards the inner wall 11, that is, the first oblique wall 122 and the second oblique wall 123 are oblique towards the battery 4 along the length direction L of the battery module.

Therefore, as shown in FIG. 3, the end plate 1 includes a middle portion and two end portions. The inner wall 11 and the straight wall 121 at the middle portion are parallel with each other, and the middle portion of the end plate 1 has the same thicknesses in respective positions. Both the first oblique wall 122 and the second oblique wall 123 are oblique towards the inner wall 11, and thus the thickness of each end portion of the end plate 1 is gradually decreased. Here, the thickness refers to a dimension of the end plate 1 in the length direction L.

In the field of batteries, an energy density is an important indicator. The energy density refers to energy stored in per unit weight of a battery. Therefore, in order to increase the energy density of the battery module, a weight of the battery module needs to be reduced.

For the end plate 1, the middle portion is subjected to a larger expansion force, and the end portions are subjected to the smaller expansion force. That is, a requirement for the strength of the end portions is lower than that of the middle portion. Therefore, in this embodiment, reducing the thickness of the two end portions of the end plate 1 can reduce an amount of material used for the end plate 1 while satisfying the strength requirement, thereby reducing the weight of the end plate 1 and thus increasing the energy density of the battery module.

Herein, an obtuse angle formed between the first oblique wall 122 and the straight wall 121 has a value within a range of 145°-175°, for example, 163°; and an obtuse angle formed between the second oblique wall 123 and the straight wall 121 has a value within a range of 145°-175°, for example, 163°.

In addition, the above-mentioned two obtuse angles may have same or different values, there is no strict relationship between the two obtuse angles, and specific values of the two abuse angles may be set according to actual requirements.

In this embodiment, as shown in FIG. 3, the greater the value of the obtuse angle between the first oblique wall 122 and the straight wall 121 is, the greater the thickness, strength and weight of the end portions of the end plate 1 are; and the smaller the value of the obtuse angle between the first oblique wall 122 and the straight wall 121 is, the smaller the thickness, strength and weight of the end plate 1 are. Therefore, in actual applications, factors such as the strength and the energy density of the end plate 1 can be both considered, and then an angle between each of the two oblique walls and the straight wall 121 can be reasonably set.

Further, as shown in FIG. 2 and FIG. 3, the end plate 1 further includes a first side wall 13 and a second side wall 14 at two ends in the width direction W, and both the first side wall 13 and the second side wall 14 are perpendicular to the inner wall 11. Meanwhile, the first side wall 13 is connected to the first oblique wall 122 and the inner wall 11, and the second side wall 14 is connected to the second oblique wall 123 and the inner wall 11. Therefore, along the length direction L of the battery module, a length of the first side wall 13 is smaller than a distance D2 between the straight wall 121 and the inner wall 11, and a length of the second side wall 14 is smaller than the distance D2 between the straight wall 121 and the inner wall 11. Meanwhile, the first side wall 13 abuts against and is welded to a corresponding side plate 2, and the second side wall 14 abuts against and is welded to a corresponding side plate 2.

In another embodiment, since the external wall 12 includes the first oblique wall 122 and the second oblique wall 123, the first oblique wall 122 may be directly connected to the inner wall 11 after being oblique, and the second oblique wall 123 may be directly connected to the inner wall 11 after being oblique. In this case, the end plate 1 does not include the first side wall 13 and the second side wall 14. However, compared with the embodiment in which the oblique walls are directly connected to the inner wall 11, the present embodiment, by providing the first side wall 13 and the second side wall 14, can increase a welding area between the end plate 1 and the side plate 2, thereby improving reliability of a connection between the end plate 1 and the side plate 2.

When the oblique walls are directly connected to the inner wall 11, an acute angle is formed between each of the oblique walls and the inner wall 11, and each of the oblique walls is connected to the inner wall 11 at an edge of the end plate 1. When the end plate 1 is subjected to a force, stress concentration easily occurs at this position, resulting in a decrease in the strength of the end plate 1. In this embodiment, taking the first side wall 13 as an example, the first side wall 13 forms an obtuse angle with respect to the first oblique wall 122, and forms a right angle (or approximately a right angle) with respect to the inner wall 11, which, compared with the acute angle, can reduce the stress concentration at the edge of the end plate 1.

In the above embodiments, as shown in FIG. 2 and FIG. 3, two ends of the first mounting portion 18 are fixed to the straight wall 121 and the inner wall 11, respectively, and two ends of the second mounting portion 19 are fixed to the straight wall 121 and to the inner wall. After being fixed, the first side wall 13, the first oblique wall 122, the inner wall 11, the first mounting portion 18, and a part of the straight wall 121 form a first cavity 15; and likewise, the second side wall 14, the second oblique wall 123, the inner wall 11, the second mounting portion 19, and a part of the straight wall 121 form a second cavity 16. The first cavity 15 has a width A in the width direction W, and the second cavity 16 has a width A in the width direction W. The width A may be within a range of 25 mm to 45 mm, for example, 34.95 mm, 40 mm or the like.

In this embodiment, the cavity structures of the first cavity 15 and the second cavity 16 can reduce the weight of the end plate 1, thereby increasing the energy density of the battery module. The width of the first cavity 15 in the width direction W refers to a distance between the first side wall 13 and the first mounting portion 18, and the width of the second cavity 16 in the width direction W refers to a distance between the second side wall 14 and the second mounting portion 19. The width A of the first cavity 15 and the second cavity 16 can indicate a distance between the first end plate mounting hole 181 and the corresponding end portion of the end plate 1 and a distance between the second end plate mounting hole 191 and the corresponding end portion of the end plate 1.

It can be understood that the width A being too large or too small may affect the assembly reliability of the battery module. When the width A is too large, the first end plate mounting hole 181 and the second end plate mounting hole 191 will be close to the middle portion of the end plate 1 which is subjected to a large expansion force of the battery, thereby reducing the strength of the end plate 1 and the resistance against the expansion force of the battery, and as a result, deformation and failure may easily occur. When the width A is too small, the first oblique wall 122 and the second oblique wall 123 will be small and the end plate 1 will have a large weight, which is not conducive to increasing the energy density of the battery module. Therefore, in this embodiment, all of the assembly reliability of the battery module, the strength of the end plate 1 and the energy density of the battery module should be considered, and then the width A of the cavity can be reasonably set.

Specifically, as shown in FIG. 2 and FIG. 3, a first strengthening rib 151 is provided in the first cavity 15, and a second strengthening rib 161 is provided in the second cavity 16. The first strengthening rib 151 and the second strengthening rib 161 are obliquely disposed and oblique towards opposite directions. Two ends of the first strengthening rib 151 are respectively fixed to the inner wall 11 and the straight wall 121, and two ends of the second strengthening rib 161 are respectively fixed to the inner wall 11 and the straight wall 121. Therefore, the first strengthening rib 151 divides the first cavity 15 into two cavities having different shapes, one being in a pentagonal structure and the other being in a quadrangular structure, and a truss structure formed by the two can further increase the strength of the end plate 1.

In this embodiment, providing the first strengthening rib 151 in the first cavity 15 and the second strengthening rib 161 in the second cavity 16 can improve the strength of the end plate 1 in the first cavity 15 and the second cavity 16. Moreover, the first strengthening rib 151 and the second strengthening rib 161 being oblique can reduce the number of ribs while improving the strength, thereby reducing the weight of the end plate 1.

Specifically, as shown in FIG. 3, the obtuse angle formed between the first strengthening rib 151 and the straight wall 121 is within a range of 100° to 150°, for example, 120°, 126.8° or the like; and likewise, the obtuse angle formed between the second strengthening rib 161 and the straight wall 121 is within a range of 100° to 150°, for example, 126.8°, 130° or the like.

Similarly, the above-mentioned two obtuse angles may have a same value or different values, and either one of the two obtuse angles may have a larger value than that of the other one, and the specific values of the two abuse angles may be set according to actual requirements.

Further, as shown in FIG. 2 and FIG. 3, the first mounting portion 18, the second mounting portion 19, the inner wall 11, and the straight wall 121 form a third cavity 17, and the third cavity 17 has a rectangular cross section. Meanwhile, a plurality of third strengthening ribs 171 are provided in the third cavity 17, and two ends of each third strengthening rib 171 are fixed to the inner wall 11 and the straight wall 121, respectively. Similarly, providing the third strengthening ribs 171 in the third cavity 17 can improve the strength of the end plate 1 at a position of the third cavity 17. As described above, the end plate 1 is subjected to a large expansion force of the battery at the position of the third cavity 17, and therefore, in order to make it have sufficient strength, a plurality of third strengthening ribs 171 are provided in the third cavity 17.

Herein, each of a thickness of the first strengthening rib 151, a thickness of the second strengthening rib 161, and a thickness of the third strengthening rib 171 is smaller than or equal to each of a thickness of the inner wall 11 and a thickness of the external wall 12.

It can be understood that the larger the thicknesses of the first strengthening rib 151, the second strengthening rib 161 and the third strengthening rib 171 are, the larger the strength and weight of the end plate 1 are. Therefore, the thicknesses of the three strengthening ribs should not be too large. Specifically, the thicknesses of the three strengthening ribs may be smaller than or equal to the thickness of the inner wall 11 and the thickness of the external wall 12. In this case, the strength of the end plate 1 can be improved, and the end plate 1 can be prevented from being excessively heavy due to the addition of the reinforcing ribs.

Specifically, as shown in FIG. 3, both the first mounting portion 18 and the second mounting portion 19 are in prismatic structures, and the first mounting portion 18 and the second mounting portion 19 are disposed symmetrically with respect to a center line of the end plate (e.g., length direction L of the battery module). In the third cavity 17, each of the third strengthening ribs 171 is oblique, and adjacent third strengthening ribs 171 have opposite oblique directions, thereby improving uniformity in strength of respective portions of the end plate 1 and reducing the number of third strengthening ribs 171. Moreover, adjacent third strengthening ribs 171 form a triangular structure with the inner wall 11 or with the straight wall 121; or, a third strengthening rib 171, the inner wall 11, the straight wall 121 and the corresponding mounting portion form a trapezoidal structure.

As shown in FIG. 3, the first mounting portion 18 and the second mounting portion 19 each have a rectangular structure, and therefore, when there are oblique third strengthening ribs 171 provided in the third cavity 17, each of two third strengthening ribs 171 located at two edges of the third cavity 17 in the width direction W can form a trapezoidal structure with the corresponding mounting portion, the corresponding inner wall 11 and the corresponding external wall 12, and a top edge of the trapezoid (the shorter side) is formed by the inner wall 11. Therefore, the inner wall 11 and the external wall 12 are supported by the first mounting portion 18 (or second mounting portion 19) and the third strengthening ribs 171, and a distance between supporting points on the inner wall 11 is smaller than a distance between supporting points on the external wall 12. Therefore, when the end plate 1 is provided in a trapezoidal structure, an improvement in the strength of the inner wall 11 is more than an improvement in the strength of the external wall 12. That is, the strength of the inner wall 11 is larger than the strength of the external wall 12, thereby further reducing the risk of the inner wall 11 of the end plate 1 breaking under the expansion force of the battery.

Meanwhile, the trapezoidal structure can reduce the number of third strengthening ribs 171 and the weight of the end plate 1 while improving the strength of the end plate 1.

In the above embodiments, a sum of the thickness of the inner wall 11 of the end plate 1 and the thickness of the external wall 12 of the end plate 1 is D1, and a distance between the inner wall 11 and the external wall 12 is D2. Herein, a ratio of D1 to D2 is within a range of 1/5 to 3/5.

Specifically, in an embodiment, the thickness of the inner wall 11 of the end plate 1 is 1.8 mm, and the thickness of the external wall 12 is 2.2 mm. Then, a sum of the thickness of the inner wall 11 and the thickness of the external wall 12 is 4 mm. The distance between the inner wall 11 and the external wall 12 is 10.2 mm, and then the ratio of D1 to D2 in this embodiment is approximately equal to 0.4.

In the end plate 1, the larger the ratio of D1 to D2 is, the greater the strength and weight of the end plate 1 are; and the smaller the ratio of D1 to D2 is, the lesser the strength and weight of the end plate 1 are. Therefore, the ratio of D1 to D2 can be reasonably set in consideration of the strength and weight of the end plate 1.

In addition, in the above embodiments, the end plate mounting hole is a circular hole, a kidney-shaped hole or an elliptical hole.

When assembling the battery module, the end plate mounting hole and a battery pack mounting hole should be arranged coaxially. In order to reduce a precision requirement on designing and manufacturing of respective parts and reduce a precision requirement on matching of respective parts, the end plate mounting hole can be a kidney-shaped hole or an elliptical hole. When assembling the battery module, the kidney-shaped hole or elliptical hole can allow the assembly to be performed even if the end plate mounting hole and the battery pack mounting hole are arranged at a low coaxiality.

When the end plate mounting hole is a kidney-shaped hole or an elliptical hole, preferably, having a long edge along the width direction W of the battery module and a short edge along the length direction L of the battery module, it can be achieved that the end plate 1 has sufficient strength along the length direction L.

According to the present disclosure, the end plate 1 can not only withstand the expansion force of the battery, but also have a small weight while increasing the energy density of the battery module.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:
1. A battery module, comprising:
    a plurality of batteries stacked in a length direction L of the battery module; and
    an end plate located at an end of the plurality of batteries in the length direction L,
    wherein the end plate is provided with at least one end plate mounting hole, and each of the at least one end plate mounting hole extends along a height direction H of the battery module,
    the end plate comprises an inner wall and an external wall that are disposed opposite to each other in the length direction L, and an axis of each of the at least one end plate mounting hole comprises a first distance L1 from the inner wall and a second distance L2 from the external wall, and
    the first distance L1 is greater than the second distance L2,
    wherein the external wall comprises a straight wall, a first oblique wall and a second oblique wall, and the first oblique wall and the second oblique wall are located at two ends of the straight wall along the width direction W,
    the straight wall is in parallel with the inner wall, and both the first oblique wall and the second oblique wall are oblique towards the inner wall, and
    a length of the straight wall along the width direction W is larger than a length of the first oblique wall along the width direction W, and is also larger than a length of the second oblique wall along the width direction W.
2. The battery module according to claim 1, wherein the end plate further comprises a first mounting portion and a second mounting portion that are spaced apart along a width direction W of the battery module;
    the first mounting portion is fixed to the inner wall and the external wall, and the second mounting portion is fixed to the inner wall and the external wall, and each of the first plate portion and the second portion is provided with one of the at least one end plate mounting hole.

3. The battery module according to claim 2, wherein
an obtuse angle formed between the first oblique wall and the straight wall is within a range of 145° to 175°, and an obtuse angle formed between the second oblique wall and the straight wall is within a range of 145° to 175°.

4. The battery module according to claim 3, wherein the end plate further comprises a first side wall and a second side wall at two ends in the width direction W;
along the length direction L of the battery module, a length of the first side wall is smaller than a distance D2 between the straight wall and the inner wall, and a length of the second side wall is smaller than the distance D2 between the straight wall and the inner wall.

5. The battery module according to claim 3, wherein the first mounting portion is fixed to the straight wall and the inner wall, and the second mounting portion is fixed to the straight wall and the inner wall,
a first cavity is defined by the first side wall, the first oblique wall, the inner wall, the first mounting portion, and a part of the straight wall,
a second cavity is defined by the second side wall, the second oblique wall, the inner wall, the second mounting portion, and another part of the straight wall,
the first cavity has a width A along the width direction W, and the second cavity has a width A along the width direction W, and
wherein the width A is within a range of 25 mm to 45 mm.

6. The battery module according to claim 5, wherein a first strengthening rib is provided in the first cavity, and a second strengthening rib is provided in the second cavity,
the first strengthening rib and the second strengthening rib are obliquely disposed and towards different directions,
the first strengthening rib comprises two ends fixed to the inner wall and the straight wall, and the second strengthening rib comprises two ends fixed to the inner wall and the straight wall, and
an obtuse angle formed between the first strengthening rib and the straight wall is a range of 100° to 150°, and an obtuse angle formed between the second strengthening rib and the straight wall is within a range of 1000 to 150°.

7. The battery module according to claim 6, wherein a third cavity is defined by the first mounting portion, the second mounting portion, the inner wall and the straight wall,
a plurality of third strengthening ribs is provided in the third cavity, and each of the plurality of third strengthening ribs comprises two ends fixed to the inner wall and the straight wall, and
each of a thickness of the first strengthening rib, a thickness of the second strengthening rib and a thickness of the third strengthening rib is smaller than or equal to each of a thickness of the inner wall and a thickness of the external wall.

8. The battery module according to claim 7, wherein each of the first mounting portion and the second mounting portion is in a prismatic structure, and the first mounting portion and the second mounting portion are symmetrically disposed with respect to the length direction L of the battery module,
each of the plurality of third strengthening ribs is disposed obliquely, and adjacent third strengthening ribs of the plurality of third strengthening ribs are oblique towards different directions, and
a structure comprising a triangular cross section is formed by two adjacent third strengthening ribs of the plurality of third strengthening ribs and the inner wall or the straight wall; or a structure comprising a trapezoidal cross section is formed by one of the plurality of third strengthening ribs, the inner wall, the straight wall and a corresponding mounting portion of the first mounting portion and the second mounting portion.

9. The battery module according to claim 1, wherein a sum of a thicknesses of the inner wall and a thickness of the external wall is D1, a distance between the inner wall and the external wall is D2, and a ratio of D1 to D2 is within a range of 1/5 to 3/5.

10. The battery module according to claim 1, wherein each of the at least one end plate mounting hole is a circular hole, a kidney-shaped hole or an elliptical hole.

* * * * *